(No Model.)
J. A. McRANOLDS.
SAW DRESSING DEVICE.
No. 495,946.                     Patented Apr. 18, 1893.
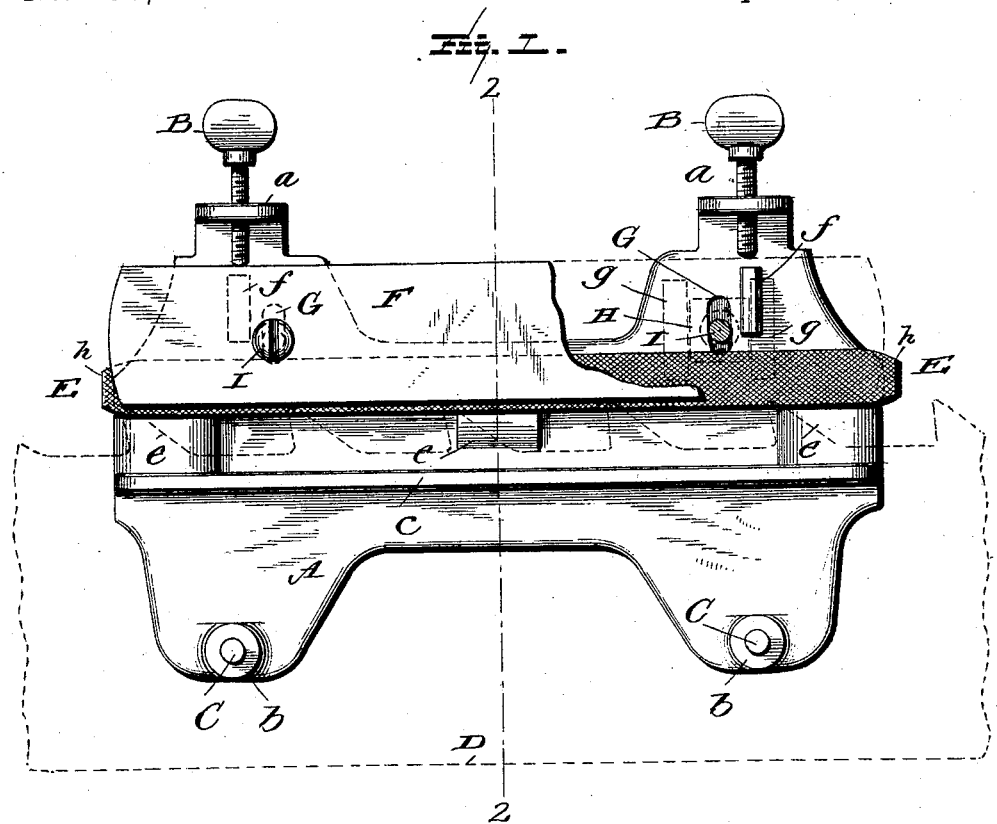
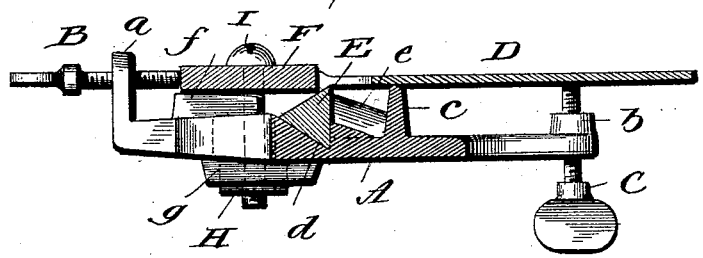
Witnesses
L. C. Hills.
B. G. Williams.
Inventor
John A. McRanolds.
per Chas. N. Fowler
Attorney

UNITED STATES PATENT OFFICE.

JOHN A. McRANOLDS, OF NASHVILLE, TENNESSEE, ASSIGNOR OF ONE-HALF TO EBENEZER BRADLEY, OF SAME PLACE.

SAW-DRESSING DEVICE.

SPECIFICATION forming part of Letters Patent No. 495,946, dated April 18, 1893.

Application filed November 19, 1892. Serial No. 452,546. (No model.)

*To all whom it may concern:*

Be it known that I, JOHN A. MCRANOLDS, a citizen of the United States, residing at Nashville, in the county of Davidson and State of Tennessee, have invented certain new and useful Improvements in Saw-Tooth Dressers; and I do hereby declare that the following is a full, clear, and exact description of the same, reference being had to the annexed drawings, making a part of this specification, and to the letters of reference marked thereon.

This invention relates to certain new and useful improvements in devices for dressing saw teeth and it has for its objects among others to provide a simple, cheap and efficient device for this purpose by which the teeth can be dressed all in the same degree and pitch and by which the pitch can be easily and quickly varied when desired. I employ a three sided or cornered file which is seated in a correspondingly shaped recess or bearing. I provide for the adjustment of the supporting plate and for the plate that clamps the file and also moves along the top of the saw. When once set the parts require no adjustment unless the pitch of the tooth is to be changed.

Other objects and advantages of the invention will hereinafter appear and the novel features thereof will be particularly pointed out in the appended claims.

The invention is clearly illustrated in the accompanying drawings, which, with the letters of reference marked thereon, form a part of this specification, and in which—

Figure 1 is a plan of my improved device with a portion broken away. Fig. 2 is a vertical cross section on the line 2 2 of Fig. 1.

Like letters of reference indicate like parts in both of the views.

Referring now to the details of the drawings by letter, A designates the base plate or main or body portion of the device which may be of any suitable material and dimensions and this body portion is provided at one edge with the upwardly-extending lugs or flanges *a* which are provided with threaded openings to receive the thumb screws B the object of which will soon appear. This body portion is further provided or formed with the lugs or enlargements *b* at right angles to the lugs *a* as seen best in Fig. 2 and which are also provided with threaded openings for the reception of the thumb screws C which are adapted to bear against the under side of the saw blade as seen in Fig. 2, in which D represents a portion of the said saw blade. These screws C are designed to be adjusted to change the inclination of the saw according to the desired shape to be given the tooth. Between the edges of the body portion or plate the same is formed or provided with the upwardly-extending rib *c* which is adapted to support the saw near its edge as shown in Fig. 2. Between this rib and the lugs *a* is a longitudinal angular channel *d* in which is designed to be seated a three cornered file E with beveled ends *h* as seen best in Fig. 2. Lugs *e* are provided connecting the rib with the bottom portion of the plate and which serve as supports for the edge or side of the file above the bottom of the said channel as seen in both of the views.

Between the rib and the lugs *a* and between the latter and the above-mentioned channel, are the transverse lugs or ribs *f* as seen best in Fig. 2 and upon which is designed to be supported the steel plate F, one edge of which bears upon the upper face of the file as is also shown best in Fig. 2.

G are transverse slots in the bottom of the body portion and upon the under side of the latter are the parallel ribs or lugs *g* as shown by dotted lines in Fig. 1 between each set of which is designed to be held a nut H on the threaded ends of the vertical bolts I which pass downward through the steel plate F and then through the said slots as seen in Fig. 1 and the nuts are then screwed up sufficiently tight to hold the plate in its adjusted position and still permit of adjustment of the said plate by the screws B as will be understood from Fig. 2.

The operation will be readily understood from the foregoing description when taken in connection with the annexed drawings. The inclination of the saw is changed by the screws C and the steel plate F is moved as may be desired by the screws B. The file is held in its recess and when one side becomes worn all that is necessary to do is to remove or loosen the plate F and change the file so that another side will be in position to act upon the saw teeth.

Modifications in details of construction may be resorted to without departing from the spirit of the invention or sacrificing any of its advantages.

It will be noticed that the file employed is different from the three cornered file in common use, the latter being tapered throughout its length while the file employed with my improved device is of the same or equal width upon its three filing surfaces and is beveled upon its ends as shown. The file being straight in contradistinction to tapering and beveled at the ends, as the file is carried along with the device to which it is attached, the file will pass over any unevenness that the saw tooth may have without cutting or damaging or breaking the corners of the tooth, and when the cutting part of the file passes along it dresses the tooth by degrees all on one equal line.

What I claim as new is—

1. A saw dressing device consisting of a body portion with transverse ribs and a longitudinal angular channel or recess, rests for a saw one of which is integral with the body portion, a plate bearing upon the file and means for adjusting the said plate, as set forth.

2. The combination with the portion having lugs for the reception of screws, transverse ribs, a longitudinal rib and a longitudinal angular channel, of screws in said lugs, a three cornered file in the channel and a plate bearing upon the file, as and for the purpose specified.

3. The combination with the body portion having integral longitudinal rib, transverse ribs, lugs and a longitudinal channel, of the screws in said lugs, the three cornered file in said channel, and the adjustable plate bearing upon the file and provided with means for adjustable attachment to the body portion, as set forth.

In testimony that I claim the above I have hereunto subscribed my name in the presence of two witnesses.

JOHN A. McRANOLDS.

Witnesses:
J. P. LeSueur,
W. L. Horn.